(12) United States Patent
Seo et al.

(10) Patent No.: US 10,917,253 B2
(45) Date of Patent: Feb. 9, 2021

(54) ETHERNET SWITCH, METHOD OF CONFIGURING IN-VEHICLE NETWORK, AND VEHICLE

(71) Applicants: HYUNDAI MOTOR COMPANY, Seoul (KR); KIA MOTORS CORPORATION, Seoul (KR)

(72) Inventors: Kang Woon Seo, Seoul (KR); Dong Ok Kim, Goyang-si (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 271 days.

(21) Appl. No.: 16/112,331

(22) Filed: Aug. 24, 2018

(65) Prior Publication Data

US 2019/0199537 A1 Jun. 27, 2019

(30) Foreign Application Priority Data

Dec. 26, 2017 (KR) .................. 10-2017-0179260

(51) Int. Cl.
  *H04L 12/12* (2006.01)
  *H04L 12/40* (2006.01)
  *H04L 12/46* (2006.01)

(52) U.S. Cl.
  CPC ........... *H04L 12/12* (2013.01); *H04L 12/40* (2013.01); *H04L 12/4625* (2013.01); *H04L 2012/40273* (2013.01)

(58) Field of Classification Search
  CPC ..... H04L 12/12; H04L 12/40; H04L 12/4625; H04L 2012/40273; Y02D 30/50
  See application file for complete search history.

(56) References Cited

U.S. PATENT DOCUMENTS

| | | | |
|---|---|---|---|
| 2016/0065409 A1* | 3/2016 | Kim | H04L 67/12 709/223 |
| 2016/0132455 A1* | 5/2016 | Ho | G06F 13/4208 710/105 |
| 2016/0364245 A1* | 12/2016 | Yun | H04L 12/40006 |
| 2017/0054574 A1* | 2/2017 | Wu | H04L 12/40013 |
| 2018/0295011 A1* | 10/2018 | Wang | H04L 12/12 |

FOREIGN PATENT DOCUMENTS

| | | |
|---|---|---|
| KR | 10-1516216 B1 | 5/2015 |
| KR | 10-1552382 B1 | 9/2015 |

\* cited by examiner

*Primary Examiner* — Charles C Jiang
*Assistant Examiner* — Voster Preval
(74) *Attorney, Agent, or Firm* — Morgan, Lewis & Bockius LLP

(57) ABSTRACT

A method of configuring an in-vehicle network includes: receiving a first wake-up signal from a first controller among a plurality of controllers in a sleep mode by an Ethernet switch; activating the Ethernet switch according to the wake-up signal; determining a routing port according to a destination address of the Ethernet data received from the first controller; and transmitting a second wake-up signal of a second controller among the plurality of controllers through a physical-layer processing device included in the Ethernet switch corresponding to the determined routing port.

10 Claims, 4 Drawing Sheets

ETHERNET SWITCH, METHOD OF CONFIGURING IN-VEHICLE NETWORK, AND VEHICLE

CROSS-REFERENCE TO RELATED APPLICATION(S)

This application claims the benefit of Korean Patent Application No. 10-2017-0179260, filed on Dec. 26, 2017, which is hereby incorporated by reference as if fully set forth herein.

TECHNICAL FIELD

The present disclosure relates to an Ethernet switch, a method of configuring an in-vehicle network, and a vehicle, and more particularly, to an Ethernet switch, a method of configuring an in-vehicle network, and a vehicle, for effectively configuring an in-vehicle network using Ethernet communication.

BACKGROUND

In general, communication between vehicular controllers (or electronic control unit (ECU)) in a vehicle has been performed using a controller area network (CAN) method. However, CAN communication has relatively low speed, and thus, attempts for introduction of commercialized Ethernet to communication between vehicular controllers have been active, recently.

Along with use of Ethernet, communication speed is increased and common inexpensive components of an in-vehicle network are also used to lower costs for system configuration, and an ECU local network is connected to one main system bus, and thus, a wiring and connection structure is advantageously and simply configured.

When an Ethernet method is used, a controller includes a central processing unit (CPU) and a physical layer (PHY) processing device (e.g., chip) for connecting the CPU to the outside. The PHY processing device is basically in charge of a physical layer as the term PHY suggests. That is, the PHY processing device is in charge of a connection part with an external part of a system configuring a controller. In more detail, the PHY processing device performs a function of receiving an external signal, converting the external signal into a signal available in the CPU, decoding or demodulating encrypted or modulated data to make the data in the form of an original packet, and then, delivering the packet to the CPU (that is, the function is a concept including a transceiver). The PHY processing device enters an operable state by receiving a setting value required for an operation from the CPU via serial communication after the CPU booting is completed.

A plurality of vehicular controllers may be present in a vehicle and may be connected to an Ethernet switch. The Ethernet switch may provide a routing function required for communication between vehicular controllers. That is, when a specific vehicular controller intends to transmit a signal to another vehicular controller, the Ethernet switch may receive and analyze the signal from the specific vehicular controller and may transmit the signal to an intended vehicular controller. In this case, when vehicular controllers are in a sleep mode, the specific vehicular controller first transmits a wake-up signal to the Ethernet switch and the Ethernet switch transmits the wake-up signal to all connected vehicular controllers to activate the all vehicular controllers. However, this operation may be ineffective in that even other vehicular controllers other than a vehicular controller that is a target of the signal of the specific vehicular controller are activated.

SUMMARY

An object of the present disclosure is to provide an Ethernet switch, a method of configuring an in-vehicle network, and a vehicle, for minimizing power consumption and error during communication between in-vehicle controllers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of configuring an in-vehicle network includes: receiving a wake-up signal from a first controller among a plurality of controllers in a sleep mode by an Ethernet switch; activating the Ethernet switch according to the wake-up signal; determining a routing port according to a destination address of the Ethernet data received from the first controller; and transmitting a wake-up signal of a second controller among the plurality of controllers through a physical-layer processing device included in the Ethernet switch corresponding to the determined routing port.

The method may further include changing a role of the physical-layer processing device included in the Ethernet switch corresponding to the determined routing port, wherein the activating of the Ethernet switch according to the wake-up signal may include activating a plurality of physical-layer processing devices included in the Ethernet switch and activating each physical-layer processing device of the Ethernet switch to have a specific role.

The specific role may be a master or a slave.

The activating of each physical-layer processing device to have the specific role may include performing control to achieve the same role between each of the remaining physical-layer processing devices of the Ethernet switch except for the physical-layer processing of the Ethernet switch corresponding to the first controller and a physical-layer processing device included in a controller corresponding to each of the remaining physical-layer processing devices.

The determining of the routing port may include extracting a destination address included in a specific field of the Ethernet data and determining the routing port corresponding to the destination address based on a routing table formed by mapping the destination address and the routing port.

The changing of the role of the physical-layer processing device may include changing the role of the physical-layer processing device corresponding to the routing port to a master or a slave in a state in which a role of the remaining physical-layer processing devices except for the physical-layer processing device corresponding to the determined routing port is maintained.

The destination address of the Ethernet data may be an Internet protocol (IP) address or a media access control (MAC) address.

In another aspect of the present disclosure, an Ethernet switch includes: a first physical-layer processing device configured to receive a wake-up signal from a first controller among a plurality of controllers in a sleep mode; a processor configured to activate the Ethernet switch according to the wake-up signal and to determine a routing port according to the destination address of the Ethernet data received from the first controller; and a second physical-layer processing device configured to transmit a wake-up signal of a second controller among the plurality of controllers through a physical-layer processing device corresponding to the determined routing port.

The processor may change a role of the physical-layer processing device corresponding to the determined routing port, and the processor may activate a plurality of physical-layer processing devices included in the Ethernet switch and may activate each physical-layer processing device to have a specific role. The specific role may be a master or a slave.

The processor may perform control to achieve the same role between each of the remaining physical-layer processing devices of the Ethernet switch except for the physical-layer processing of the Ethernet switch corresponding to the first controller and a physical-layer processing device included in a controller corresponding to each of the remaining physical-layer processing devices.

The processor may be further configured to extract a destination address included in a specific field of the Ethernet data; and a routing table storage configured to store a routing table formed by mapping the destination address and the routing port.

The processor may determine the routing port corresponding to the destination address based on the destination address and the routing table.

The processor may change the role of the physical-layer processing device corresponding to the routing port to a master or a slave in a state in which a role of the remaining physical-layer processing devices except for the physical-layer processing device corresponding to the routing port is maintained.

The destination address of the Ethernet data may be an Internet protocol (IP) address or a media access control (MAC) address.

In another aspect of the present disclosure, a vehicle includes: the aforementioned Ethernet switch; and a plurality of controllers activated according to a wake-up signal transmitted by the Ethernet switch.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present disclosure, examples of which are illustrated in the accompanying drawings. The suffixes "module" and "unit" of elements herein are used for convenience of description and do not have any distinguishable meanings or functions.

Figure 1:
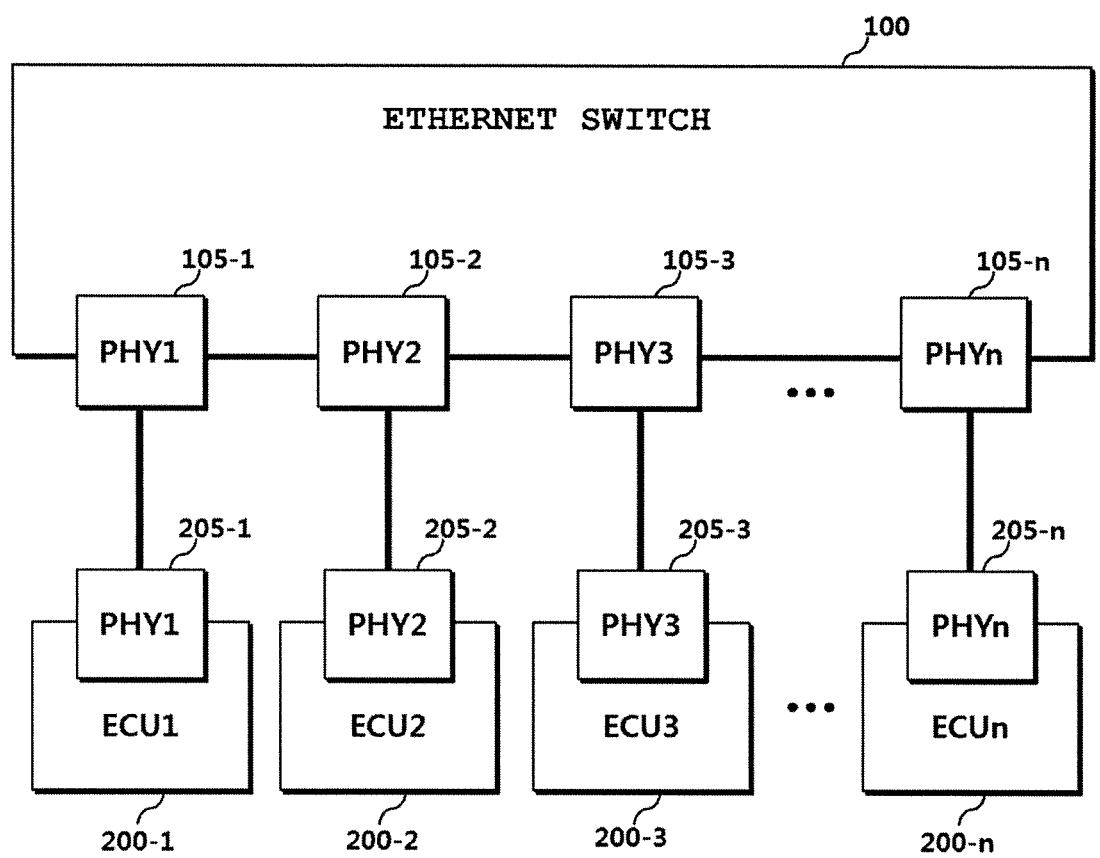
FIG. 1 is a diagram showing a network system according to an embodiment of the present disclosure.

FIG. 1 is a diagram showing a network system according to an embodiment of the present disclosure.

Referring to FIG. 1, a network system 10 may be an in-vehicle network system for communication between in-vehicle electronic devices and may include an Ethernet switch 100 and a plurality of controllers 200-1 to 200-n (n is an integer equal to or greater than 2). Here, the number and types of a plurality of controllers may be changed in any way according to the type, specification, and so on of a vehicle. In the specification, a controller refers to an electronic device such as an electronic control unit (ECU).

The plurality of controllers 200-1 to 200-n may be a plurality of Ethernet communication controllers using an Ethernet communication protocol and may transmit and receive data through the Ethernet switch 100.

The plurality of controllers 200-1 to 200-n may each correspond to any one of a transmission control unit (TCU), four wheel drive (4WD) controller, an electric stability control (ESC), a cluster, a steering angle sensor (steering angle sensor), a smart cruise control (SCC), an airbag control unit (ACU), an electric parking brake (EPB), and an adaptive front-lightning system (AFLS) but the scope of the present disclosure is not limited thereto.

Each of the plurality of controllers 200-1 to 200-n may include a central processing device (not shown) and physical-layer processing devices 205-1 to 205-n for connecting the central processing device to the outside (e.g., Ethernet switch).

The physical-layer processing devices 205-1 to 205-n may be basically in charge of a physical layer and may be connected directly to the Ethernet switch 100. In more detail, the physical-layer processing devices 205-1 to 205-n may perform a function of receiving an external signal, converting the external signal into a signal available in the central processing device, decoding or demodulating encrypted or modulated data to make the data in the form of an original packet, and then, delivering the packet to the central processing device. On the other hand, the physical-layer processing devices 205-1 to 205-n may encrypt or modulate the packet of the central processing device, may convert the packet into the form of a signal to be transmitted in a physical layer, and may transmit the converted signal to the Ethernet switch 100.

The physical-layer processing devices 205-1 to 205-n may have a normal mode and a sleep mode. The normal mode refers to an active state in which a signal is capable of being normally transmitted and received a signal and the sleep mode refers to an inactive standby state in which a signal is not capable of being normally transmitted and received and only a minimum operation for receiving a wake-up signal is performed.

A physical-layer processing device in a sleep mode may enter a normal mode upon receiving a wake-up signal. On the other hand, a physical-layer processing device in a normal mode may enter a sleep mode when the device does not receive any signal for a predetermined time period (e.g., five minutes).

As an example of an event of generating a wake-up signal, when a KRE system detects door open, a key box becomes in an accessory (ACC) power-state, an IGN1 power-state, or the like but this is merely an example.

In addition, the physical-layer processing devices 205-1 to 205-n may have a role of a master or a slave. A role of the physical-layer processing devices 205-1 to 205-$n$ may be set by a central processing device of the controllers 200-1 to 200-$n$ but the scope of the present disclosure is not limited thereto. To establish link-up for Ethernet communication, connected physical-layer processing devices need to be paired with each other. The pairing may be capable of being established by a physical-layer processing device set as a master and a physical-layer processing device set as a slave and may not be capable of being established between physical-layer processing devices as masters or physical-layer processing devices as slaves The Ethernet switch 100 may be connected to the controllers 200-1 to 200-$n$ and may analyze a signal transmitted from the controllers 200-1 to 200-$n$ to determine a destination of the signal. In addition, the Ethernet switch 100 may perform a function of transmitting the signal to a controller corresponding to the destination. For example, when any one controller (first controller) intends to transmit a signal to another controller (second controller), the first controller may transmit a signal including a destination address (i.e., address information of the second controller) to the Ethernet switch 100, and the Ethernet switch 100 may analyze the signal to extract the destination address and may transmit the signal to the second controller corresponding to the destination address.

The Ethernet switch 100 may include physical-layer processing devices 105-1 to 105-$n$ that are connected to the physical-layer processing devices 205-1 to 205-$n$ of the controllers 200-1 to 200-$n$, respectively. A structure and function of the physical-layer processing devices 105-1 to 105-$n$ are substantially the same as the physical-layer processing devices 205-1 to 205-$n$ and, a detailed description thereof is omitted herein.

In the various embodiments, the physical-layer processing devices 105-1 to 105-$n$ and the physical-layer processing devices 205-1 to 205-$n$ may be circuitries required to implement physical layer function and include both physical coding sublayer (PCS) and physical medium dependent (PMD) layer functionality.

Figure 2:
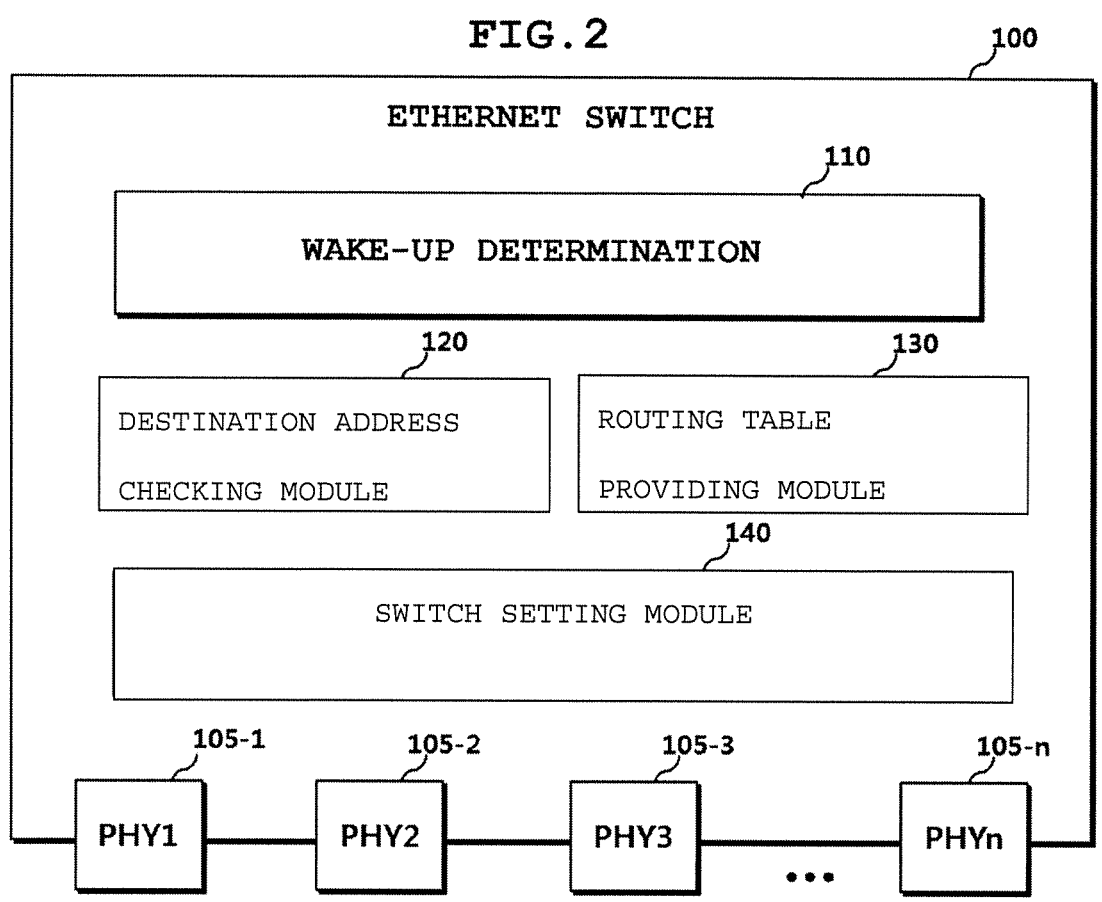
FIG. 2 is a detailed diagram illustrating the Ethernet switch shown in FIG. 1.

FIG. 2 is a detailed diagram illustrating the Ethernet switch shown in FIG. 1.

Referring to FIG. 2, the Ethernet switch 100 may further include a wake-up determination module 110, a destination address checking module 120, a routing table storage 130, and a switch setting module 140.

The wake-up determination module 110 may transmit Ethernet data transmitted by the controllers 200-1 to 200-$n$ to the destination address checking module 120, may acquire a destination address of the Ethernet data from the destination address checking module 120, and may determine the controllers 200-1 to 200-$n$ corresponding to the destination address with reference to a routing table. To this end, the wake-up determination module 110 may be operatively connected to the destination address checking module 120 and the routing table storage 130.

The wake-up determination module 110 may provide information on the controllers 200-1 to 200-$n$ corresponding to the destination address to the switch setting module 140.

The destination address checking module 120 may analyze Ethernet data according to a request of the wake-up determination module 110 to check a destination address of the Ethernet data. The destination address may be an Internet protocol (IP) address or a media access control (MAC) address but the scope of the present disclosure is not limited thereto.

The routing table storage 130 may store a routing table formed by mapping the destination address of the Ethernet data with the physical-layer processing devices 205-1 to 205-$n$ corresponding to the controllers 200-1 to 200-$n$, respectively. When the wake-up determination module 110 determines the controllers 200-1 to 200-$n$ corresponding to the destination address, the routing table storage 130 may provide the routing table.

The switch setting module 140 may control a mode and a role of each of the physical-layer processing devices 105-1 to 105-$n$. In detail, the switch setting module 140 may activate each of the physical-layer processing devices 105-1 to 105-$n$ (sleep mode→normal mode) or may deactivate each of the physical-layer processing devices 105-1 to 105-$n$ (normal mode→sleep mode). In addition, the switch setting module 140 may change a role of each of the physical-layer processing devices 105-1 to 105-$n$ to a slave from a master or may change the role to a master from a slave.

A more detailed operation of the Ethernet switch 100 is described below with reference to FIGS. 3 and 4.

Figure 3:
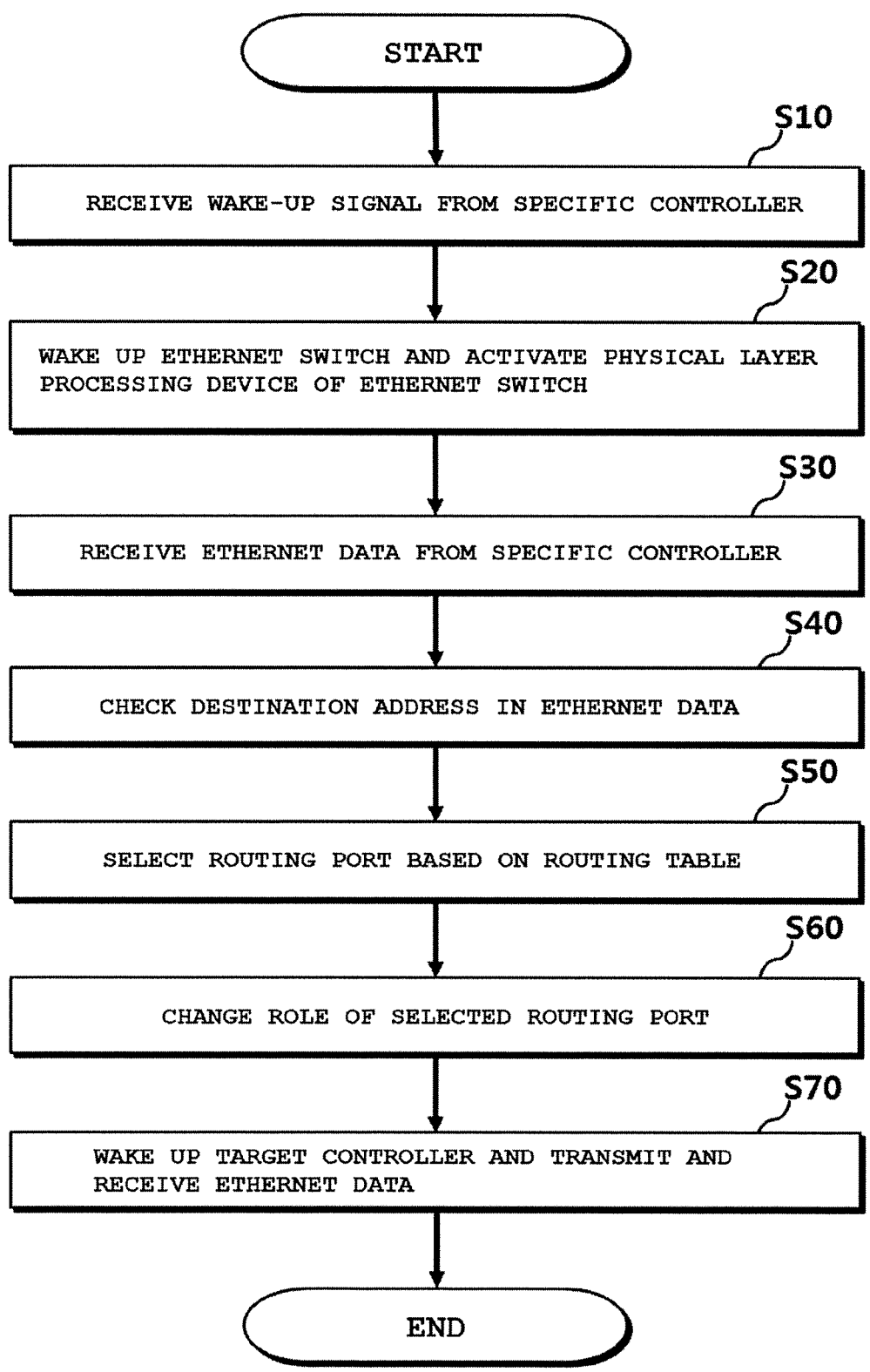
FIG. 3 is a flowchart of an operation method of an Ethernet switch.

FIG. 3 is a flowchart of an operation method of an Ethernet switch. FIG. 4 is a diagram for explanation of an operation of the Ethernet switch of FIG. 3.

Figure 4:
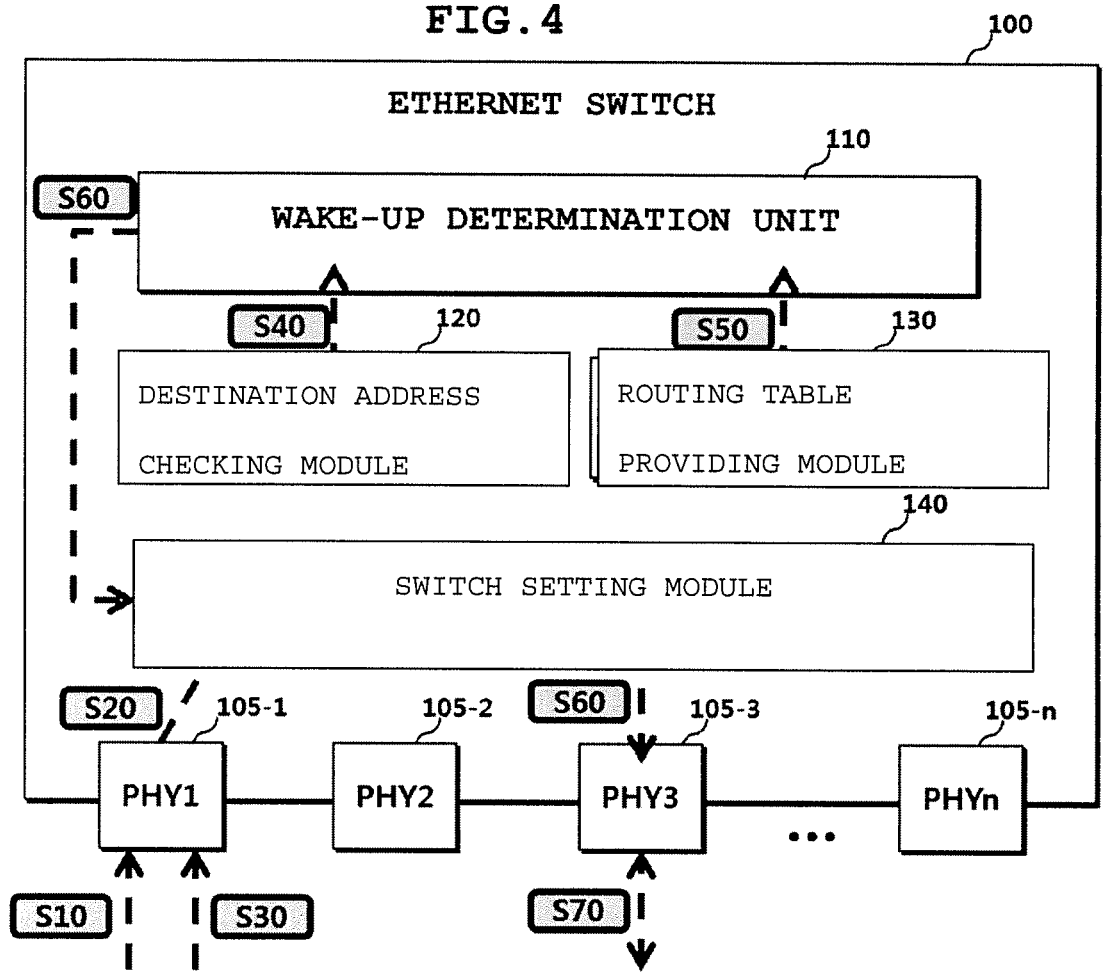
FIG. 4 is a diagram for explanation of an operation of the Ethernet switch of FIG. 3.

Referring to FIGS. 3 and 4, the plurality of controllers 200-1 to 200-$n$ and the Ethernet switch 100 are assumed to currently enter a sleep mode. Physical-layer processing devices 100-1 to 100-$n$ of the Ethernet switch 100 in a sleep mode and the physical-layer processing devices 105-1 to 105-$n$ of the plurality of controllers 200-1 to 200-$n$ in a sleep mode may be in a standby state in which only a minimum operation for transmitting and receiving a wake-up signal, and the physical-layer processing devices 105-1 to 105-$n$ may have a role of a slave and the physical-layer processing devices 205-1 to 205-$n$ may have a role of a master to transmit and receive a wake-up signal.

Here, the operation described with reference to FIGS. 3 and 4 may correspond to an operation of the Ethernet switch 100 when the first controller 200-1 intends to transmit an Ethernet data to the third controller 200-3. Although the first controller 200-1 and the third controller 200-3 are exemplified, substantially the same operation may also be applied to other controllers. In addition, substantially the same operation may also be applied to Ethernet data that is subject to a plurality of controllers but not one controller.

The first controller 200-1 may transmit a wake-up signal to the Ethernet switch 100 through the physical-layer processing device 205-1 and the physical-layer processing device 105-1 of the Ethernet switch 100 may receive the wake-up signal (S10).

The switch setting module 140 may activate the Ethernet switch 100 according to the received wake-up signal (S20). An activation operation of the switch setting module 140, each component included in the Ethernet switch 100 may be enabled to perform a predetermined operation. In particular, the switch setting module 140 may activate each of the physical-layer processing devices 105-1 to 105-$n$ and, in detail, may change or set a role of the remaining physical-layer processing devices 105-2 to 105-$n$) except for a physical-layer processing device (e.g., 105-1) corresponding to a controller (e.g., 205-1) that transmits a wake-up signal to a master from a slave. Accordingly, link-up between the remaining physical-layer processing devices 105-2 to 105-$n$ and the physical-layer processing devices 205-2 and 205-$n$ corresponding thereto may not be established.

Here, although the case in which a role of the remaining physical-layer processing devices 105-2 to 105-$n$ except for the physical-layer processing device corresponding to a controller that transmits the wake-up signal is changed or set to a master is exemplified, the scope of the present disclosure may include control, setting, or change for achieving the same role (e.g., master and master or slave and slave) between corresponding physical-layer processing devices in such a way that link-up is not established.

Then, the Ethernet switch 100 may receive the Ethernet data from the first controller 200-1 (S30). The received Ethernet data may be transmitted to the wake-up determination module 110 and the wake-up determination module 110 may perform an operation for determining a routing port. Here, the routing port may refer to a physical-layer processing device (i.e., 105-3) corresponding to a controller (i.e., third controller) to which the first controller 200-1 intends to transmit the Ethernet data.

The wake-up determination module 110 may transmit the received Ethernet data to the destination address checking module 120 and the destination address checking module 120 may analyze the Ethernet data to extract a destination address and may provide the destination address to the wake-up determination module 110 (S40). For example, the Ethernet switch 100 and each of the controllers 200-1 to 200-$n$ may be preset to include a destination address in a specific field of the Ethernet data and the destination address checking module 120 may receive the Ethernet data and may extract the destination address included in the specific field.

Upon receiving the destination address from the destination address checking module 120, the wake-up determination module 110 may determine a routing port corresponding to the destination address with reference to a routing table stored in the routing table storage 130 (S50). That is, the wake-up determination module 110 may determine the routing port corresponding to the destination address received from the destination address checking module 120 with reference to a routing table formed by mapping the destination address of the Ethernet data with the physical-layer processing devices 205-1 to 205-$n$ corresponding to the controllers 200-1 to 200-$n$, respectively. Here, each routing port may be identified by a serial number. For example, when the destination address indicates the third controller 200-3, a destination address and #3 may be mapped in the routing table, and the wake-up determination module 110 may determine the physical-layer processing device 105-3 corresponding to #3 as a routing port.

The wake-up determination module 110 may transmit information on the determined port to the switch setting module 140 and the switch setting module 140 may set or change a role of the physical-layer processing device 105-3 in such a way that the physical-layer processing device 105-3 as the determined routing port and the controller 200-3 corresponding thereto have different roles (e.g., master and slave) (S60). For example, the switch setting module 140 may change a role of the physical-layer processing device 105-3 as the determined routing port to a slave from a master (S60).

Accordingly, as link-up between the physical-layer processing device 205-3 of the controller 200-3 having a role of a master and the physical-layer processing device 105-3 having a role of a slave is established, the controller 200-3 may be capable of communicating with the Ethernet switch 100.

After the role of the physical-layer processing device 105-3 is changed, the Ethernet switch 100 may transmit a wake-up signal to the third controller 200-3 as a target controller through the physical-layer processing device 105-3 and, upon receiving the wake-up signal, the third controller 200-3 may enter a normal mode from a sleep mode. Then, the Ethernet switch 100 may transmit the Ethernet data received from the first controller 200-1 to the third controller 200-3 (S70). To this end, the Ethernet switch 100 may further include a separate component (not shown) for generating a wake-up signal and storing Ethernet data and the switch setting module 140 may perform these operations.

In the present disclosure, the wake-up determination module 110, the destination address checking module 120, and the switch setting module 140 may be implemented with hardware devices, for example, a processor such as a central processing unit (CPU) execution of which causes the processor to perform functions of the wake-up determination module 110, the destination address checking module 120, and the switch setting module 140.

According to an Ethernet switch and an operation method thereof according to an embodiment of the present disclosure, even if a wake-up signal is received from a specific controller, other all controllers may not be activated but only a controller to which Ethernet data is to be transmitted may be activated and, thus, a network may be partially configured.

A network may be partially configured to prevent wake-up of unnecessary controllers and to effectively reduce power consumption in a vehicle.

In addition, the possibility that an unnecessary controller is waken-up and communication of a required controller is delayed or a malfunction of the required controller occurs may be reduced.

The aforementioned method can also be embodied as computer readable code stored on a computer readable recording medium. The computer readable recording medium is any data storage device that can store data which can thereafter be read by a computer. Examples of the computer readable recording medium include a read only memory (ROM), a random access memory (RAM), magnetic tapes, magnetic disks, a flash memory, and optical data storage devices. The computer readable recording medium can also be distributed over network coupled computer systems so that the computer readable code is stored and executed in a distributed fashion.

In addition, network generally may include two or more computers, often referred to as nodes or stations, which are coupled together through selected media and various other network devices for relaying, transmitting, repeating, translating, filtering, etc., the data between the nodes. The term "network device" generally refers to the computers and their network interface cards (NICs) as well as various other devices on the network, such as repeaters, bridges, switches, routers, bridge routers, to name a few examples. A network operating according to a given communications protocol may be expanded by using one or more repeaters, bridges or switches. A repeater is a hardware device that functions at the physical layer and re-transmits each received packet to every other port.

Further, a network switch or Ethernet switch may include a switching matrix coupled to the ports across a bus and memory for temporarily storing network data, such as Ethernet packets or the like. Significant processing capability may be performed to direct the traffic and to perform other tasks, such as initialization, configuration, statistical monitoring and network management, to name a few examples. Network management may include memory management, execution of the spanning tree algorithm according to the IEEE (Institute of Electrical and Electronics Engineers) 802.1 Standard, maintenance and management of the management information base (MIB) or MIB II structure, etc.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A method of configuring an in-vehicle network, the method comprising steps of:
   receiving a first wake-up signal from a first controller among a plurality of controllers in a sleep mode by an Ethernet switch;
   activating, by a processor, the Ethernet switch according to the first wake-up signal;
   determining, by the processor, a routing port according to a destination address of Ethernet data received from the first controller;
   changing, by the processor, a role of a physical-layer processing device included in the Ethernet switch corresponding to the determined routing port; and
   transmitting a second wake-up signal of a second controller among the plurality of controllers through the physical-layer processing device,
   wherein the step of activating the Ethernet switch includes, when the Ethernet switch includes a plurality of physical-layer processing devices, activating the plurality of physical-layer processing devices included in the Ethernet switch to assign a first role which is assigned to each of the plurality of controllers, and
   wherein the step of changing the role of the physical-layer processing device includes changing the role of the physical-layer processing device to a second role in a state in which the first role of each of the plurality of physical-layer processing devices except for the physical-layer processing device corresponding to the routing port is maintained.

2. The method of claim 1, wherein the first role includes a master, and
   wherein the second role includes a slave.

3. The method of claim 1, wherein the step of determining a routing port includes:
   extracting the destination address included in the Ethernet data; and
   determining the routing port corresponding to the destination address based on a routing table by mapping the destination address and the routing port.

4. The method of claim 1, wherein the destination address of the Ethernet data is an Internet protocol (IP) address or a media access control (MAC) address.

5. An Ethernet switch comprising:
   a first physical-layer processing device configured to receive a first wake-up signal from a first controller among a plurality of controllers in a sleep mode;
   a processor configured to:
      activate the Ethernet switch according to the first wake-up signal
      determine a routing port according to a destination address of the Ethernet data received from the first controller, and
      change a role of the physical-layer processing device corresponding to the determined routing port; and
   a second physical-layer processing device configured to transmit a second wake-up signal of a second controller among the plurality of controllers through a physical-layer processing device corresponding to the determined routing port,
   wherein the processor activates a plurality of physical-layer processing devices included in the Ethernet switch and activates each physical-layer processing device to assign a first role which is assigned to each of the plurality of controllers,
   wherein the processor changes the role of the physical-layer processing device corresponding to the routing port to a second role in a state in which a role of each of the plurality of physical-layer processing devices except for the physical-layer processing device corresponding to the routing port is maintained.

6. The Ethernet switch of claim 5, wherein the first role includes a master and the second role includes a slave.

7. The Ethernet switch of claim 5, wherein the processor is further configured to:
   extract the destination address included in the Ethernet data; and
   store a routing table by mapping the destination address and the routing port.

8. The Ethernet switch of claim 5, wherein the processor determines the routing port corresponding to the destination address based on the destination address and the routing table.

9. The Ethernet switch of claim 5, wherein the destination address of the Ethernet data is an Internet protocol (IP) address or a media access control (MAC) address.

10. A vehicle comprising the Ethernet switch of claim 5 includes a plurality of controllers activated according to the wake-up signals transmitted by the Ethernet switch.

* * * * *